United States Patent
Welch

(10) Patent No.: US 8,398,017 B2
(45) Date of Patent: Mar. 19, 2013

(54) CONTINUOUS COMPOSITE FAN DUCT AND THRUST REVERSER

(75) Inventor: John M. Welch, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 951 days.

(21) Appl. No.: 12/365,376

(22) Filed: Feb. 4, 2009

(65) Prior Publication Data
US 2010/0193628 A1    Aug. 5, 2010

(51) Int. Cl.
*B64D 27/00* (2006.01)
(52) U.S. Cl. ............. 244/54; 244/53 B; 60/796; 60/797; 60/798; 384/29
(58) Field of Classification Search .................... 244/54, 244/53 B; 60/796, 797, 798; 384/29
See application file for complete search history.

(56) References Cited

U.S. PATENT DOCUMENTS

| | | | |
|---|---|---|---|
| 4,541,673 A | | 9/1985 | Greiert |
| 4,790,137 A | * | 12/1988 | Quinn .......................... 60/226.1 |
| 5,161,752 A | | 11/1992 | Cockerham et al. |
| 5,251,435 A | | 10/1993 | Pauley |
| 5,806,302 A | | 9/1998 | Cariola et al. |
| 6,546,715 B1 | | 4/2003 | Blevins et al. |
| 6,584,763 B2 | | 7/2003 | Lymons et al. |
| 2010/0059634 A1 | * | 3/2010 | Vauchel et al. ............. 244/53 B |
| 2010/0148012 A1 | * | 6/2010 | McDonough et al. ...... 244/53 B |

* cited by examiner

*Primary Examiner* — J. Woodow Eldred
(74) *Attorney, Agent, or Firm* — Hovey Williams LLP

(57) ABSTRACT

A duct having a continuous C-shaped cross section slidably attached to a strut supporting an aircraft engine. The duct may comprise an inner wall, an outer wall, a first end wall, a second end wall, at least one slider, a thrust reverser, and an outer cowl panel of a thrust reverser. The inner wall may comprise a forward section and an aft section. The aft section may be integral with the first end wall, the second end wall, the outer wall, and the at least one slider. The forward section may comprise a right half and a left half which may be pivotally attached to the strut and may pivot to an open position when the rest of the fan duct is slid aftward away from the engine. The duct, excluding the forward section of the inner wall, may slide aftward on its at least one slider, providing engine access.

17 Claims, 5 Drawing Sheets

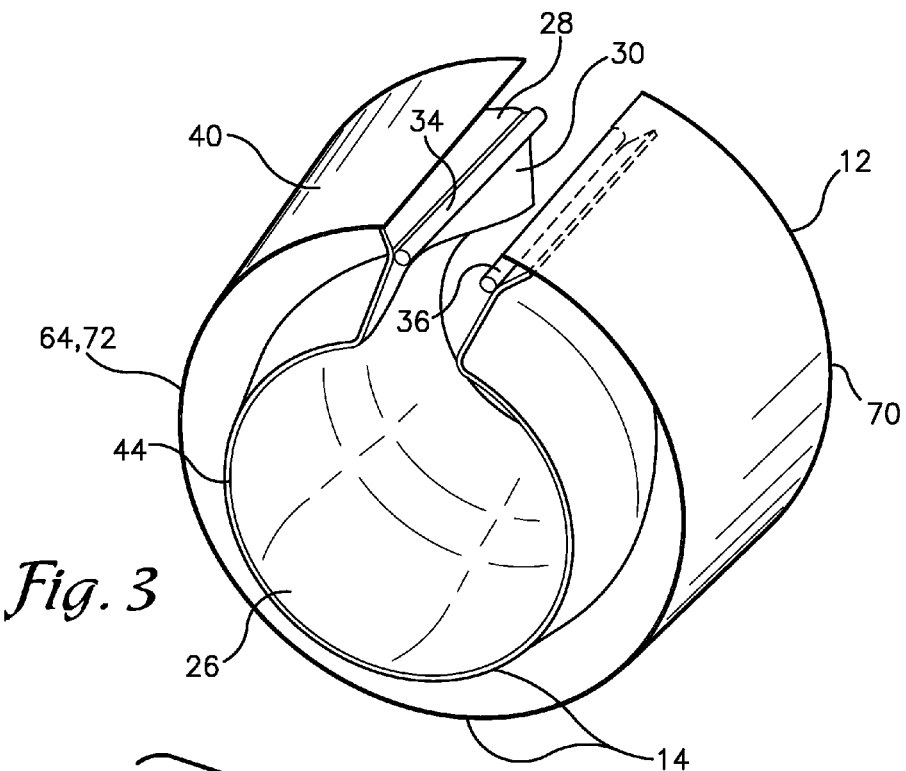
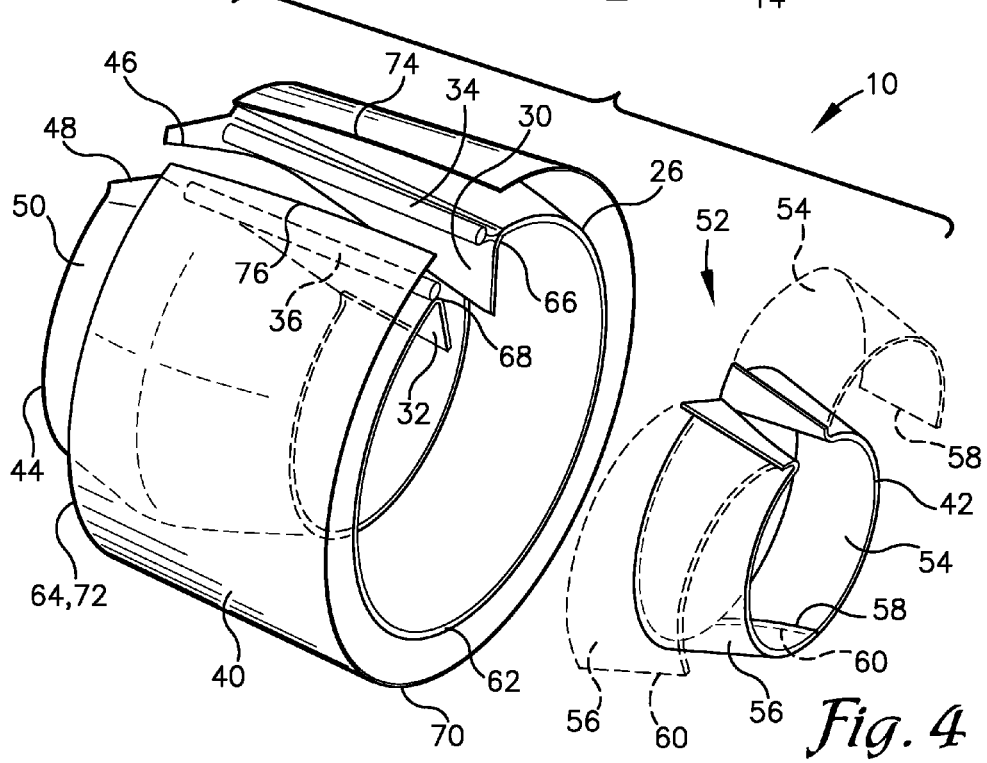

CONTINUOUS COMPOSITE FAN DUCT AND THRUST REVERSER

BACKGROUND

1. Field

The present invention relates to aircraft components. More particularly, the invention relates to a continuous composite fan duct and thrust reverser slidably attached to a strut of an aircraft.

2. Related Art

Many single-aisle aircrafts feature engines supported by struts protruding from each wing. The engines are each surrounded by various structural and control components, such as a fan duct and/or a thrust reverser. Mounting and operation of the fan duct and thrust reverser traditionally require a number of fittings, such as upper and lower bifurcation beams, upper and lower compression pads, forward and inner vee-blade fittings for attachment to a fan case, and large hinge pins at the strut.

To attach the fan case to the fan duct and thrust reverser, at least one of the vee-blades is inserted into a vee-groove on the fan case. Because a tight fit is required, lining up vee-blade fittings with corresponding vee-grooves in the fan case can be difficult and labor intensive. Vee-blades are also prone to cracking and wear, in part due to the strain the vee-blade experiences while being forced into the vee-groove.

To provide access to the engine for maintenance or repair, the fan duct and thrust reverser are constructed in two halves which can pivot upward about the large hinge pins at the strut and require upper and lower bifurcation beams to connect the two halves to each other. A disadvantage of this configuration is that the fittings required to allow this access to the engine adds cost and weight to the aircraft. Also, the fittings and bifurcation beams provide inefficient load paths in which the strain of the load on the aircraft structure is locally concentrated at the areas where the fittings are attached to the thrust reverser and/or fan duct. The strain caused by an inefficient load path can lead to cracks and other structural faults in the aircraft structure over time.

Because the two halves of the fan duct and thrust reverser are quite heavy, they are opened using power door opening systems in order to access the engine for repairs. The power door opening systems are also heavy, adding weight to the aircraft, and require intense engine interface. Additionally, if the engine needs to be removed or replaced, cranes must first lift the heavy thrust reverser off of the aircraft. This process can be expensive and labor intensive.

Accordingly, there is a need for an apparatus and method for accessing the engine of the aircraft that overcomes the limitations of the prior art.

SUMMARY

Embodiments of the present invention provides a fan duct having a substantially continuous C-shaped cross section and configured to slidably attach to a strut supporting an aircraft engine. The fan duct may comprise an inner wall, an outer wall, a first end wall, a second end wall, at least one slider, a thrust reverser, and an outer cowl panel of a thrust reverser.

The inner wall may comprise a forward section and an aft section. The aft section may be integral with the first end wall, the second end wall, the outer wall, and the at least one slider. The forward section may comprise a right half and a left half which may be pivotally attached to the strut and may pivot to an open position when the other components of the fan duct are slid aftward away from the engine.

The outer wall may be integrated with a portion of the inner wall and the at least one slider. The outer wall may also converge with the outer cowl panel of the thrust reverser at an aft end of the fan duct. The slider may include a first slider and a second slider composed of composite and integrated with the fan duct. The fan duct, excluding the forward section of the inner wall, may slide aftward on the first and second slider to provide access to the engine.

The fan duct may be useful in a method for removing the engine from the aircraft. The method may comprise sliding at least a portion of the fan duct aftward along a strut of the aircraft, disconnecting the engine from the strut, and removing the engine from the strut. The method may further comprise unlatching the forward section of the inner wall of the fan duct; and pivoting the right half and the left half of the forward section upward about the strut, then disconnecting and removing the forward section from the strut.

These and other important aspects of the present invention are described more fully in the detailed description below.

BRIEF DESCRIPTION OF THE DRAWINGS

Embodiments of the present invention are described in detail below with reference to the attached drawing figures, wherein:

FIG. 3 is a rear perspective view of the fan duct of FIG. 1;

FIG. 4 is a front exploded perspective view of the fan duct of FIG. 1;

Figure 1:
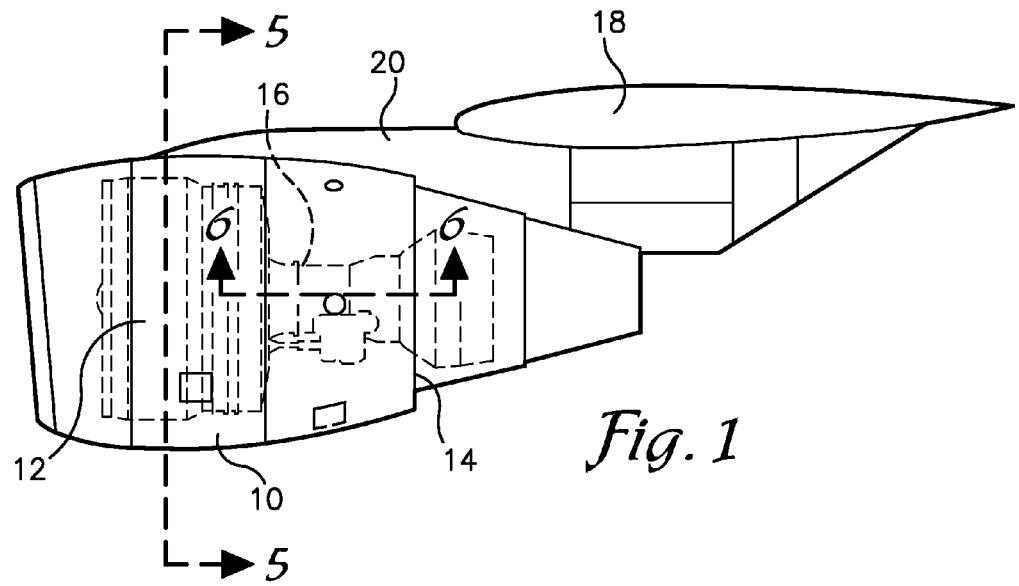
FIG. 1 is an elevation view of a fan duct constructed in accordance with an embodiment of the present invention.
Figure 2:
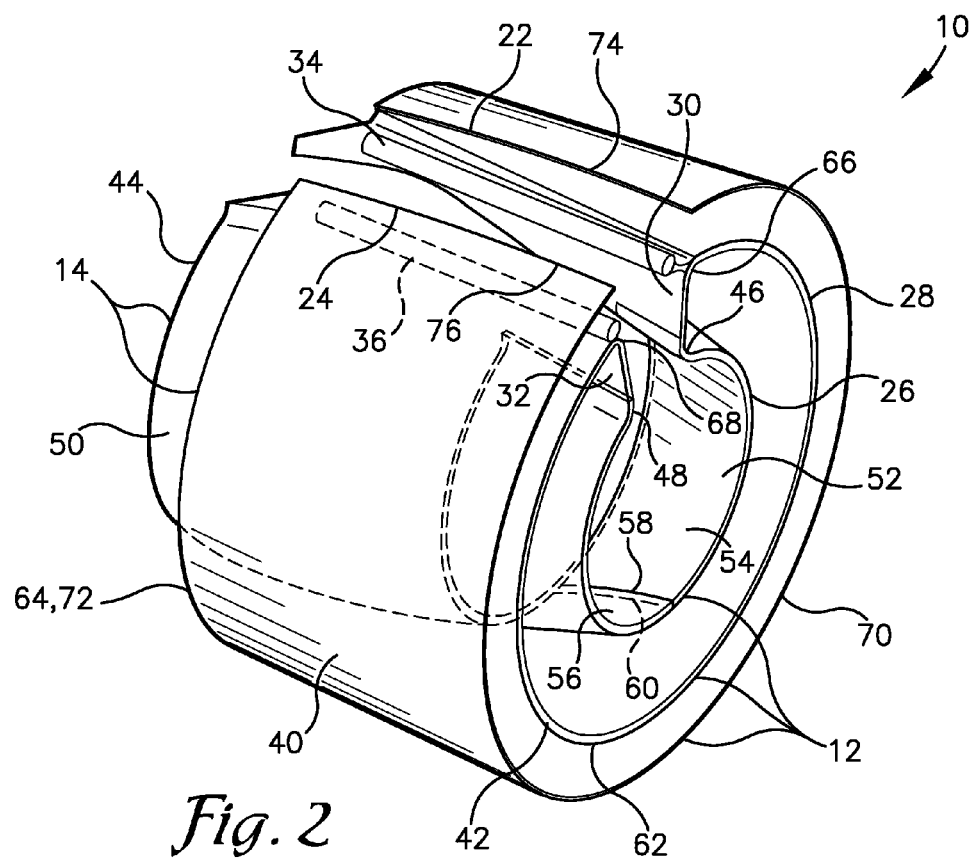
FIG. 2 is a front perspective view of the fan duct of FIG. 1.
Figure 5:
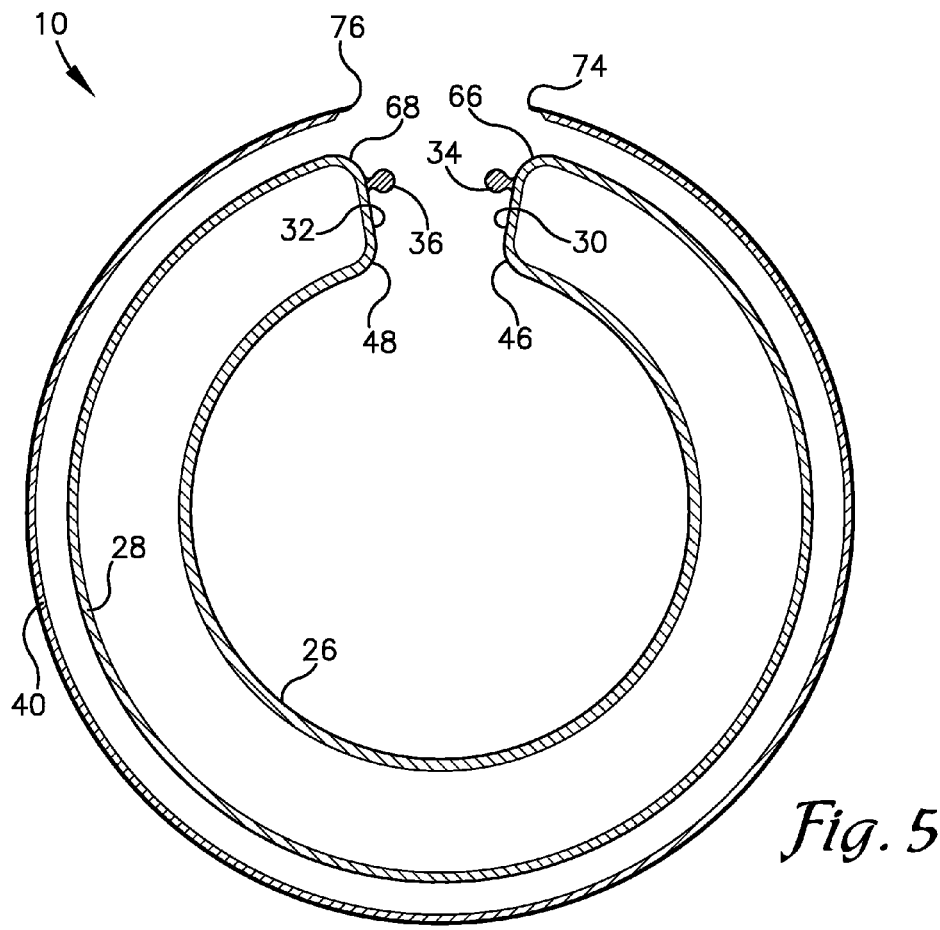
FIG. 5 is a cross sectional view of the fan duct of FIG. 1.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates a fan duct 10 constructed in accordance with an embodiment of the invention. The duct 10 has a forward end 12, an aft end 14, and a substantially continuous C-shaped cross section swept circumferentially around an engine 16 of an aircraft 18 and configured to slidably attach to a strut 20 supporting the engine 16. The fan duct 10, as illustrated in FIGS. 2-5 may have a first edge portion 22 and a second edge portion 24 extending from the forward end 12 to the aft end 14 such that the C-shaped cross section extends substantially around the engine 16 from the first edge portion 22 to the second edge portion 24. The fan duct 10 may comprise an inner wall 26, an outer wall 28, a first end wall 30, a second end wall 32, one or more sliders 34,36, a thrust reverser 38 (illustrated in FIG. 6), and an outer cowl panel 40 of the thrust reverser 38. The components of the fan duct 10 may be primarily composed of composite materials.

The inner wall 26 may comprise a forward edge 42 at the forward end 12 of the fan duct 10, an aft edge 44 at the aft end 14 of the fan duct 10, a first edge 46 at the first edge portion 22 of the fan duct 10, and a second edge 48 at the second edge portion 24 of the fan duct 10. The inner wall 26 may wrap around at least a portion of the engine 16. For example, the inner wall 26 may wrap about 350-degrees around the engine 16. The volume inward of the inner wall 26 may be larger towards its center and taper proximate the forward edge 42 and the aft edge 44. For example, the inner wall 26 may be shaped such that a cross-sectional area inward of the inner wall 26 is smaller proximate the forward and aft edges 42,44 than a cross-sectional area inward of the inner wall 26 proximate the engine 16. The inner wall 26 may be comprised of composite materials sufficient to withstand heat produced by the engine 16 during operation of the aircraft 18.

The inner wall 26 may also comprise an aft section 50 and a forward section 52, as illustrated in FIG. 4, such that the aft section 50 may slide aftward away from the engine 16 and the forward section 52 may be too small in cross section to slide past the engine 16. The aft section 50 may be attached to or integral with the first end wall 30, the second end wall 32, the outer wall 28, and the one or more sliders 34,36. The forward section 52 may abut or be pressed against the aft section 50, but is not required to attach or be latched to the aft section 50 of the inner wall 26. The forward section 52 may comprise a right half 54 and a left half 56. At or proximate to the first edge 46 and the second edge 48 of the forward section 52 of the inner wall 26, the right half 54 and the left half 56 may be pivotally connected to the strut 20 via hinges or other means for pivotal attachment known in the art. The right half 54 may comprise a first split end 58 and the left half 56 may comprise a second split 60 end which may be latched or otherwise joined with the first split end 58 when the forward section 52 is in a closed position. In an open position, the left half 56 and the right half 54 may be pivoted upward to provide access to the engine 16.

Because the forward section 52 of the inner wall 26 may have a cross-sectional area smaller than the widest part of the engine 16, the forward section 52 may not slide aft along the strut 20 past the engine 16 with the rest of the fan duct 10. Therefore, providing a forward section 52 with a pivotable right half 54 and left half 56 can allow access to the engine 16. Additionally, the forward section 52 is much lighter and easier to open than an entire fan casing and thrust reverser and does not require complex and heavy power door opening systems. Therefore, if necessary, the forward section 52 is also easier to remove from the strut 20 than the prior art fan ducts in which the entire fan duct had to be removed to remove or replace the engine 16.

The outer wall 28 may be positioned outward of and substantially wrap around the inner wall 26. For example, the outer wall 28 may also wrap about 350-degrees around the engine 16 and the inner wall 26. The outer wall 28 may comprise a forward edge 62 at the forward end 12 of the fan duct 10, an aft edge 64 at the aft end 14 of the fan duct 10, a first edge 66 at the first edge portion 22 of the fan duct 10, and a second edge 68 at the second edge portion 24 of the fan duct 10. In various embodiments of the invention, the outer wall 28 may be spaced a distance from the outer cowl panel 40 at the forward edge 62 of the outer wall 28 and may converge with the outer cowl panel 40 at the aft edge 64 of the outer wall 28. Additionally, the aft edge 64 of the outer wall 28 may be integral with the outer cowl panel 40.

The first end wall 30 may extend from the first edge 46 of the inner wall 26 to the first edge 66 of the outer wall 28 and may be integral with one or both of the inner wall 26 and the outer wall 28. The second end wall 32 may extend from the second edge 48 of the inner wall 26 to the second edge 68 of the outer wall 28 and may be integral with one or both of the inner wall 26 and the outer wall 28.

The one or more sliders 34,36 may be formed of composite material and may comprise a first slider 34 and a second slider 36. The first slider 34 may be integral with the first end wall 30 and the second slider 36 may be integral with the second end wall 32. The first and second sliders 34,36 may each comprise an elongated insert piece which may be slidably coupled within or along a track portion (not shown) of the strut 20. The sliders 34,36 may be integral with one or more of the inner wall 26, the outer wall 28, the first end wall 30, and the second end wall 32. One method of integrating composite sliders with a fan duct is disclosed in non-provisional U.S. patent application Ser. No. 12/365,620, titled INTEGRAL COMPOSITE SLIDER FOR AIRCRAFTS, filed on Feb. 4, 2009, herein incorporated by reference in its entirety.

Figure 6:
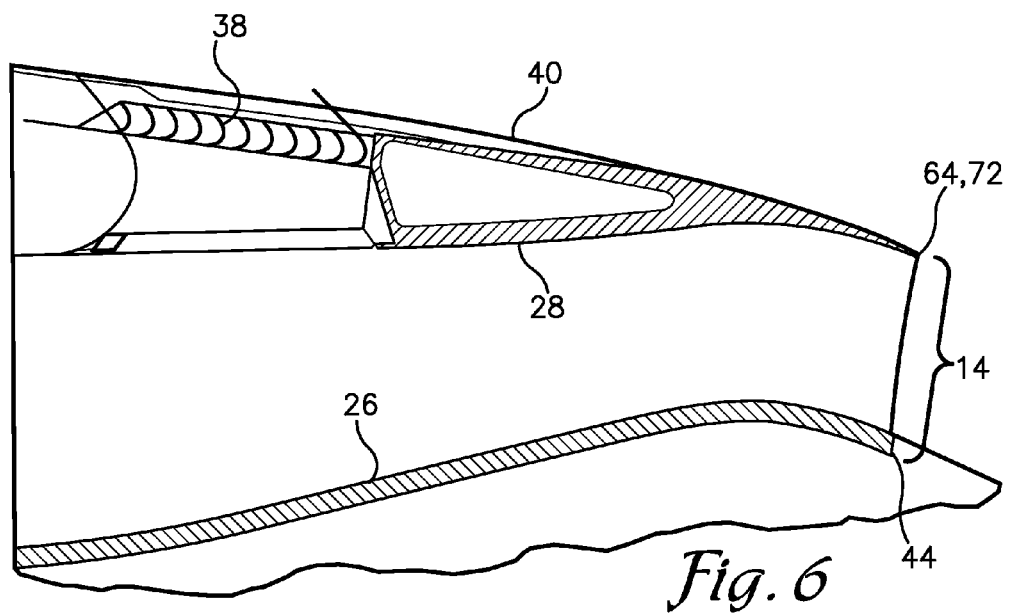
FIG. 6 is a cross sectional view of the fan duct of FIG. 1 and a thrust reverser housed therein.

The thrust reverser 38, illustrated in FIG. 6, may be any thrust reverser known in the art, such as a pivot door-type thrust reverser or a cascade-type thrust reverser, among others, and may include conventional blocker doors, actuators, etc. The outer cowl panel 40 of the thrust reverser 38 may be of any type of cowl known in the art having any type of cowl opening devices for reverse thrust. For example, the outer cowl panel 40 may employ a pivot door-type thrust reverser or a cascade-type thrust reverser, among others, without departing from the scope of the invention. The outer cowl panel 40 may have a forward edge 70 at the forward end 12 of the fan duct 10, an aft edge 72 at the aft end 14 of the fan duct 10, a first edge 74 at the first edge portion 22 of the fan duct 10, and a second edge 76 at the second edge portion 24 of the fan duct 10. As described above, in various embodiments of the invention, the outer wall 28 may converge with the outer cowl panel 40 at the aft edge of the outer wall 28 and the aft edge of the outer cowl panel 40.

Figure 7:
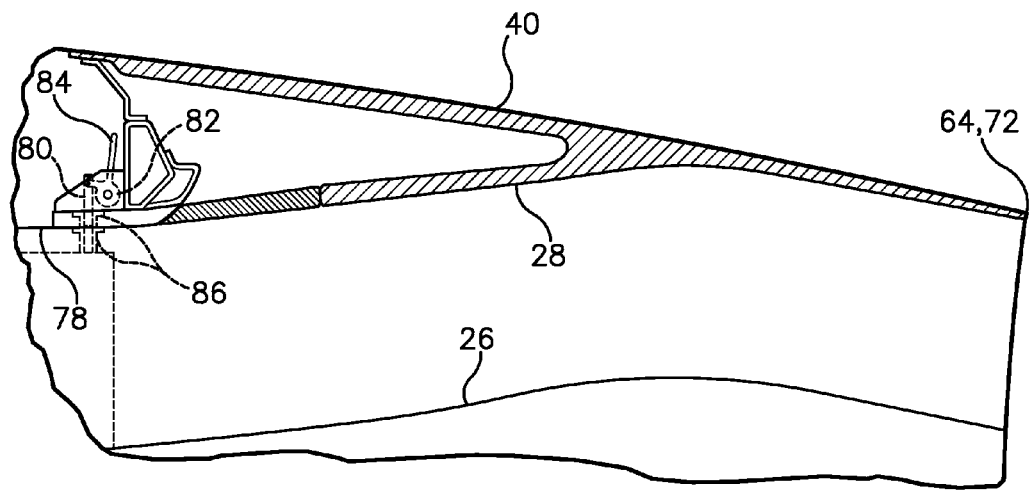
FIG. 7 is a cross sectional view of the fan duct of FIG. 1 with a cam pin in a first position for attaching a fan case.
Figure 8:
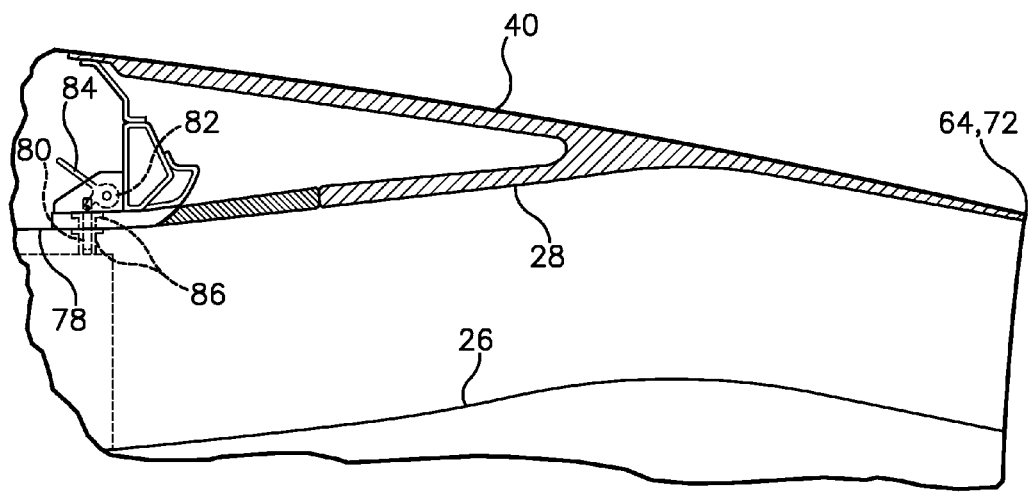
FIG. 8 is a cross sectional view of the fan duct of FIG. 1 with the cam pin in a second position for attaching a fan case.

The outer wall 28 may create a sheer interface with a fan case 78 of the engine 16 and may be fastened to the fan case by a series of cam pins, eliminating the need for vee-blades, which are prone to cracking. For example, there may be ten cam pins spaced circumferentially around the outer wall 28. As illustrated in FIGS. 7 and 8, a cam pin 80 may be inserted through an opening in the outer wall 28, proximate its forward edge 62, and into the fan case 78. The cam pin 80 may be attached to an eccentric cam fitting 82 having an eccentric cam lever 84, such that when the eccentric cam fitting 82 is rotated (such as by applying force to its lever 84), the cam pin 80 is inserted through the outer wall 28 and into the fan case 78. Bushings 86 may be provided to receive the cam pin 80. Additionally, a lock provision (not shown) may be provided on the eccentric cam lever 84 to prevent movement during flight.

Figure 9:
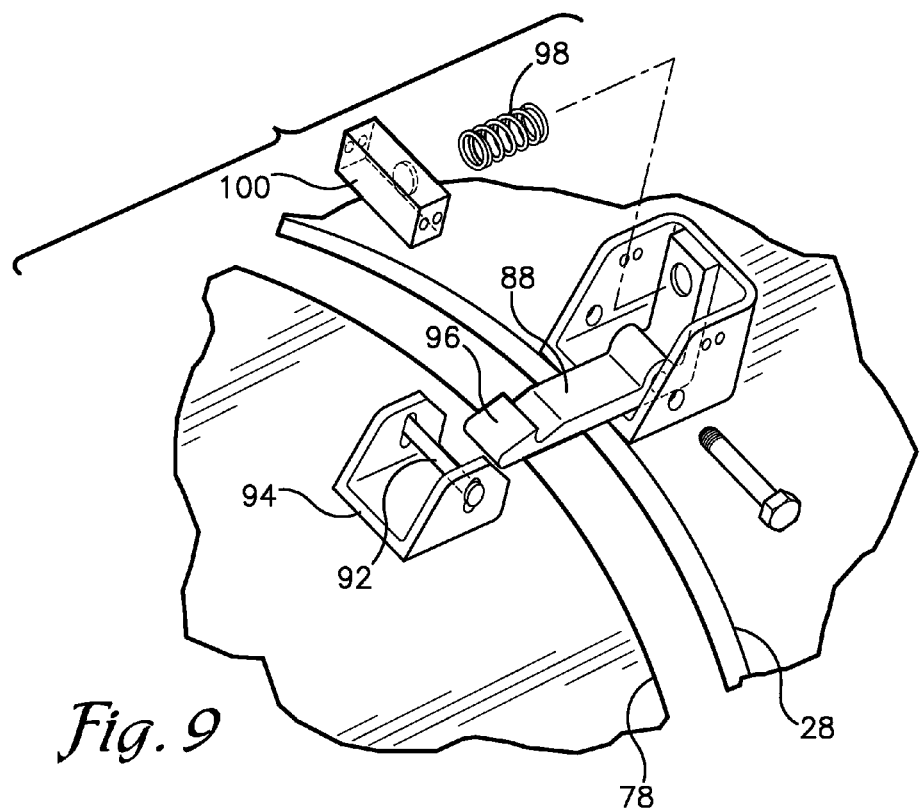
FIG. 9 is an exploded fragmentary perspective view of a latch fitting for attaching the fan case to the fan duct of FIG. 1.
Figure 10:
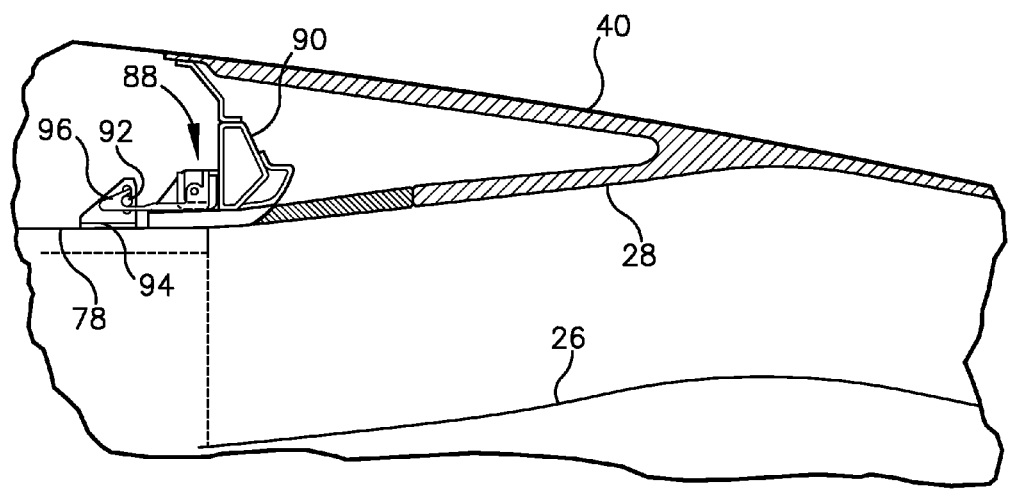
FIG. 10 is a cross-sectional view of the latch fitting for attaching the fan case to the fan duct of FIG. 1.

In alternative embodiments, the cam fitting 82 may be replaced with an actuator capable of engaging and retracting the cam pin 80. In another alternative embodiment illustrated in FIGS. 9 and 10, a latch fitting 88 may be mounted to or integral with a torque box 90 of the fan duct 10 and may be operable to latch to a retention pin 92 of a receiver fitting 94 mounted or integral with the fan case 78. The retention pin 92 may be spring biased and operable to move up and down. A forward portion 96 of the latch fitting 88 may have a ramp geometry such that the latch fitting 88 causes the retention pin 92 to ride up the ramp geometry of the forward portion 96 when the latch fitting 88 is moved in a horizontal direction toward the retention pin 92. Then the retention pin 92 may snap into location aft of the forward portion 96 of the latch fitting 88. The latch fitting 88 may also comprise a compression spring 98 and a spring clamp fitting 100, as illustrated in FIG. 9.

The fan duct 10, except for the forward portion of the inner wall 26, may be slid far enough aftward along the strut 20 that access to the engine 16 may be achieved without removing the fan duct 10 from the aircraft 18. A user or a machine may manually slide the fan duct 10 forward or aftward along the strut 20, or an actuator may be employed to perform this operation. The forward portion of the inner wall 26, as discussed above, may be unlatched and placed in an open position for simple maintenance and repairs, or may be completely removed from the strut 20 if required to remove and/or replace the engine 16.

The integration of the inner wall 26, outer wall 28, first end wall 30, second end wall 32, and the first and second sliders 34,36 creates a continuous load path, eliminating localized stress points in the fan duct 10. Additionally, this integration eliminates a number of fittings, such as upper and lower bifurcation beams, upper and lower compression pads, power door opening systems and fittings to support such systems, forward and inner vee-blade fittings, and large hinge pins at the strut 20. Eliminating these parts lowers the cost and weight of the aircraft 18. Additionally, because the fan duct 10 can slide away from the engine 16, some ground support equipment can be eliminated, as can the need for cranes for crane lift of the thrust reverser 38 and fan duct 10 during engine replacement.

Although the invention has been described with reference to the embodiments illustrated in the attached drawings, it is noted that equivalents may be employed and substitutions made herein without departing from the scope of the invention as recited in the claims. For example, various shapes and configurations of fan ducts having a substantially C-shaped cross section may be slidably connected with the strut 20 without departing from the scope of this invention.

Having thus described an embodiment of the invention, what is claimed as new and desired to be protected by Letters Patent includes the following:

1. A duct for an aircraft comprising:
a forward end,
an aft end,
a first edge portion extending from the forward end to the aft end;
a second edge portion extending from the forward end to the aft end;
at least one duct wall having a substantially continuous C-shaped cross section extending circumferentially from the first edge portion to the second edge portion and configured to partially surround an engine of an aircraft, the at least one duct wall further comprising:
an inner fan duct wall extending circumferentially from the first edge portion to the second edge portion,
an outer fan duct wall positioned outward of the inner fan duct wall and integrated with at least a portion of the inner fan duct wall at or proximate the first edge portion and the second edge portion, and
an outer cowl panel, positioned outward of the outer fan duct wall, wherein the outer cowl panel converges with and is integral to the outer fan duct wall proximate the aft end of the duct; and
attachment structure for slidably attaching at least a portion of the duct to a strut of the aircraft proximate the first edge portion and the second edge portion.

2. The duct of claim 1, the attachment structure comprising a first slider proximate the first edge portion and a second slider proximate the second edge portion, wherein the first slider and the second slider are integral with the outer fan duct wall and at least a portion of the inner fan duct wall.

3. The duct of claim 1, wherein the inner fan duct wall further comprises:
an aft section integral with the outer fan duct wall;
a forward section, wherein the forward section includes:
a first split end,
a second split end,
a right half extending from the first edge portion of the duct to the first split end, and
a left half extending from the second edge portion of the duct to the second split end; and
structure for pivotally mounting the right half and the left half relative to the strut.

4. The duct of claim 3, wherein the right half and the left half are operable to pivot upward when the outer fan duct wall, the aft section of the inner fan duct wall, and the outer cowl panel slide aftward away from the forward section of the inner fan duct wall.

5. The duct of claim 1, wherein the duct is operable to slide far enough aft along the strut for engine removal while still physically attached to the aircraft and strut.

6. The duct of claim 1, wherein the duct forms an approximately 350-degree boundary around the engine.

7. The duct of claim 1, wherein the duct is comprised of composite parts.

8. The duct of claim 1, further comprising a plurality of cam pins circumferentially spaced around the outer fan duct wall and configured for linking the duct to a fan case of the aircraft.

9. An aircraft engine duct having a forward end, an aft end, and a substantially continuous C-shaped cross section, and configured to partially surround an engine of the aircraft, the duct comprising:
an inner fan duct wall having a substantially continuous C-shaped cross section and comprising a first edge and a second edge extending from the forward end to the aft end of the duct;
an outer fan duct wall, positioned outward of the inner fan duct wall, having a substantially continuous C-shaped cross section and comprising a first edge and a second edge extending from the forward end to the aft end of the duct;
a first end wall extending from the first edge of the inner fan duct wall to the first edge of the outer fan duct wall;
a second end wall extending from the second edge of the inner fan duct wall to the second edge of the outer fan duct wall;
an outer cowl panel, positioned outward of the outer fan duct wall, having a substantially continuous C-shaped cross section, a first edge extending from the forward end to the aft end of the duct, and a second end extending from the forward end to the aft end of the duct, wherein the outer cowl panel converges with the outer fan duct wall proximate the aft end of the engine duct; and at least one slider attached to at least one of the first end wall and the second end wall and configured to slidably connect the inner fan duct wall, the outer fan duct wall, and the outer cowl panel to a strut supporting the engine.

10. The aircraft engine duct of claim 9, wherein the at least one slider is integrally attached to at least one of the first end wall and the second end wall.

11. The aircraft engine duct of claim 9, wherein the inner fan duct wall further comprises:
   an aft section integral with the outer fan duct wall;
   a forward section, wherein the forward section includes:
      a first split end,
      a second split end,
      a right half extending from the first edge of the inner fan duct to the first split end, and
      a left half extending from the second edge of the inner fan duct to the second split end; and
   structure for pivotally mounting the right half and the left half relative to the strut.

12. The aircraft engine duct of claim 11, wherein the right half and the left half are operable to pivot upward when the outer fan duct wall, the aft section of the inner fan duct wall, and the outer cowl panel slide aftward away from the forward section of the inner fan duct wall.

13. The aircraft engine duct of claim 9, wherein the engine duct is operable to slide far enough aft along the strut for engine removal while still physically attached to the aircraft and strut.

14. The aircraft engine duct of claim 9, wherein the engine duct forms an approximately 350-degree boundary around the engine.

15. The aircraft engine duct of claim 9, wherein the engine duct is comprised of composite parts.

16. The aircraft engine duct of claim 9, wherein the outer fan duct wall, at least a portion of the inner fan duct wall, the first end wall, the second end wall, and the at least one slider are integrally connect with each other, forming a continuous load path.

17. The aircraft engine duct of claim 9, further comprising a plurality of cam pins circumferentially spaced around the outer fan duct wall and configured for linking the duct to a fan case of the aircraft.

* * * * *